US008667034B1

(12) United States Patent
Simon et al.

(10) Patent No.: US 8,667,034 B1
(45) Date of Patent: Mar. 4, 2014

(54) SYSTEM AND METHOD FOR PRESERVING SYMBOLIC LINKS BY A STORAGE VIRTUALIZATION SYSTEM

(75) Inventors: Dylan Simon, New York, NY (US); Ronald Brown, Dunfermline (GB); Mingzhou Joe Sun, Santa Clara, CA (US)

(73) Assignee: EMC Corporation, Hopkinton, MA (US)

( * ) Notice: Subject to any disclaimer, the term of this patent is extended or adjusted under 35 U.S.C. 154(b) by 467 days.

(21) Appl. No.: 12/034,505

(22) Filed: Feb. 20, 2008

(51) Int. Cl.
*G06F 12/00* (2006.01)
*G06F 17/30* (2006.01)

(52) U.S. Cl.
CPC ............................ *G06F 17/30197* (2013.01)
USPC ....................................................... 707/827

(58) Field of Classification Search
USPC ............................................. 707/999.002, 827
See application file for complete search history.

(56) References Cited

U.S. PATENT DOCUMENTS

| | | | |
|---|---|---|---|
| 6,947,940 B2 * | 9/2005 | Anderson et al. | 707/613 |
| 2004/0059703 A1 * | 3/2004 | Chappell et al. | 707/1 |
| 2005/0149528 A1 * | 7/2005 | Anderson et al. | 707/9 |
| 2006/0041575 A1 * | 2/2006 | Sciarra | 707/101 |
| 2007/0234292 A1 * | 10/2007 | Kumar et al. | 717/120 |
| 2008/0208927 A1 * | 8/2008 | Chikusa et al. | 707/203 |
| 2009/0049459 A1 * | 2/2009 | Battepati et al. | 719/331 |

OTHER PUBLICATIONS

"Link Globally, Act Locally: A Centrally Maintained Database of Symlinks", by Arch Mott, LISA V, Sep. 30-Oct. 3, 1991, San Diego, CA, pp. 127-128.*
Techy: Find All Symlinks (Symbolic Links) on a Linux System, by Richy B., Jul. 19, 2007, http://blog.rac.me.uk/2007/07/19/techy-find-all-symlinks-symbolic-links-on-a-linux-system/.*
UNIX FreeBSD 8.0 Man Page Set—Find command, Feb. 24, 2008, http://www.unix.com/man-page/FreeBSD/1/find/.*

* cited by examiner

*Primary Examiner* — Jay Morrison
(74) *Attorney, Agent, or Firm* — Dergosits & Noah LLP; Todd A. Noah

(57) ABSTRACT

The present invention enables a storage virtualization system to identify and preserve symlinks stored in a mixed protocol NFS+CIFS NAS system. Using the results of a multi-protocol scan, a storage virtualization system may identify which data objects are symlinks. The storage virtualization system may also determine the symlinks' target path information either by monitoring access or by referring to metadata discovered during the scan. After recording this target path information, the storage virtualization system may provide symlink expansion capabilities separate from the client computer or the NAS system. In addition, this target path information may be preserved upon symlink migration to a second NAS system.

20 Claims, 2 Drawing Sheets

SYSTEM AND METHOD FOR PRESERVING SYMBOLIC LINKS BY A STORAGE VIRTUALIZATION SYSTEM

CROSS-REFERENCE TO RELATED APPLICATIONS

This application is related to U.S. patent application Ser. No. 11/966,733 (filed Dec. 28, 2007), entitled SYSTEM AND METHOD FOR RECONCILING MULTI-PROTOCOL SCAN RESULTS BY A STORAGE VIRTUALIZATION SYSTEM, which is incorporated herein by reference for all purposes.

TECHNICAL FIELD

The present invention relates generally to storage virtualization systems, and specifically, to a system and method for resolving certain file references for a storage virtualization system.

BACKGROUND OF THE INVENTION

Many of today's network attached storage (NAS) systems are being managed by storage virtualization systems. Storage virtualization systems monitor the data objects stored on a first NAS system ("source," "source server" or "src"), and can synchronize, migrate, and/or copy the data objects ("storage virtualization operations") to a second NAS system ("destination," "destination server" or "dst"). The benefit of using a storage virtualization system for performing such operations is that it does not require bringing either NAS system offline. In other words, a client computer may still access data objects on the source or destination NAS system while the storage virtualization system is performing its operations. The storage virtualization system may be placed as an intermediary between the client computer that generates or accesses the data objects, and the source NAS server that stores the data objects. In some instances, when the client computer requests access to the source NAS server, the storage virtualization system may cause the client computer to be redirected to the destination NAS server without the client computer's intervention or knowledge. As such, the storage virtualization system is considered transparent.

There are many reasons for performing storage virtualization operations. For example, an organization using one NAS system may decide to incorporate a second NAS system in order to reduce load on the first NAS system. A storage virtualization system can facilitate migration of data objects from the source NAS system to a destination NAS system. In another example, an organization may want to keep a second NAS system as a real-time backup of a first NAS system. A traditional backup system would require locking out user access in order to ensure that the data objects are not accessed or altered during backup. Storage virtualization does not require such locking out, thereby reducing downtime and maintaining productivity. One will appreciate that there are a number of other ways to benefit from storage virtualization.

Client computers and NAS systems typically communicate with one another over a network, though they may also be directly connected. Effective communication requires that the instructions and commands passed from the client computer to its associated NAS system are recognized and understood. One skilled in the art will appreciate that client computers and NAS systems may communicate using one of many network file system protocols. Each protocol has its own specifications, instructions and conventions.

Two of the most commonly used protocols include the Network File System ("NFS") protocol, and the Common Internet File System ("CIFS") protocol. In a typical NAS system, a NFS-compatible client computer (such as a UNIX, Linux, Mac OS or other UNIX-variant computer) will communicate with a NFS NAS system using NFS commands, and a CIFS-compatible client computer (such as a Windows® computer) will communicate with a CIFS NAS system using CIFS commands. Generally, NFS computers do not interact with CIFS computers, and CIFS computers do not interact with NFS computers. As a result, it is not common for a NFS-compatible client computer to be associated with a CIFS NAS system, or for a CIFS-compatible client computer to be associated with a NFS NAS system.

There are, however, some NAS systems known as "mixed-protocol" or "NFS+CIFS" NAS systems capable of recognizing NFS and CIFS protocols. As a result, both NFS-compatible client computers and CIFS-compatible client computers may associate with a mixed-protocol NAS system. Despite these capabilities, NFS+CIFS NAS systems will typically adhere to one protocol or the other, but not both. If data objects are stored on mixed-protocol NAS system using both protocols, NFS data objects and CIFS data objects may be separated to prevent confusion.

In order to effectively perform its operations, a storage virtualization system must be able to use the proper protocol when interacting with its associated NAS systems. Presently, a storage virtualization system handling data objects between a NFS client computer and a NFS NAS system will use the NFS protocol. Similarly, a storage virtualization system handling data objects between a CIFS client computer and a CIFS NAS system will use the CIFS protocol. Because the two protocols are not cross-compatible, most storage virtualization systems used today will only use the protocol of its associated NAS systems. A storage virtualization system may have a NFS-compatible aspect and a CIFS-compatible aspect. When a storage virtualization system is associated or connected to a NAS system, it must be configured to use the protocol of the NAS system. However, as organizations incorporate NAS systems of differing protocols, it becomes difficult to configure the storage virtualization system for each associated NAS system, especially when the storage virtualization system is associated with mixed protocol NFS+CIFS NAS systems. As a result, storage virtualization systems placed as an intermediate between NFS-compatible client computers and CIFS-compatible client computers that are associated with a NFS+CIFS NAS system will encounter problems arising from the differences between the protocols.

There are many known differences between the NFS and CIFS protocol. One known difference is the treatment of symbolic links, also known as "soft links" or "symlinks." A symlink is a certain file type that points or forwards to the location of another associated file or directory (called the "symlink target" or "target"). A symlink target may reside in the same directory, file system or computer as the symlink, or a symlink may point to a target stored in another mounted file system. One skilled in the art will appreciate that a symlink is not directly "linked" to its target, but rather, the symlink contains or is associated with the path address for its target (called "target path information" or "target path location"). The target path information may be an absolute path address, a relative path address, or any other type of data that may represent a path address. The target path information may be stored as metadata or other data associated with the symlink. When a user removes a symlink, the target to which it pointed remains unaffected. However, moving or deleting the symlink's target will "break" the symlink since the location to where it pointed will no longer exist. If a new symlink target replaces another symlink target, but uses the same name, the symlink will continue to point to the new target. The symlink makes no distinction between old or new targets, so long as the target's name and path address is the same. A person having ordinary skill in the art will appreciate that the process of forwarding access from the symlink to the symlink's target is known as "symlink expansion."

Symlinks are unique to NFS-compatible UNIX-based client computers and NFS NAS systems. If the symlink is located on a UNIX client computer, the UNIX operating system is responsible for expanding a symlink and forwarding access to the target. On the other hand, if the symlink is located on a NFS NAS system or NFS+CIFS NAS system, then the NAS system or NAS system software may perform symlink expansion. One will also appreciate that a symlink may appear as another file or data object when displayed in a file directory, but may have a special icon, symbol, file attribute or property associated with it to denote that it is a symlink, rather than a data file with data content. On the other hand, CIFS-compatible client computers and CIFS NAS systems do not inherently recognize or use symlinks. Symlinks are not part of the CIFS-compatible client computer operating system and so symlinks do not natively exist on these types of computers. As a result, symlink expansion will not be performed on a CIFS-compatible client computer or a CIFS NAS system.

Because symlinks are recognized in NFS and UNIX, storage virtualization operations between a NFS or UNIX-based client computer, source server and destination server will not break symlinks. Thus, the storage virtualization system will not interfere with the client computer's or NAS system's ability to perform symlink expansion. Additionally, if the storage virtualization system is performing storage virtualization operations between an NFS source server and an NFS destination server, no special steps are necessary to ensure that symlinks and symlink targets are transferred from the source to the destination.

Conversely, issues may arise when a mixed protocol NAS system stores symlinks and their associated targets. Because a mixed protocol NAS system may store data objects using the NFS protocol as well as data objects stored using the CIFS protocol, a mixed protocol NAS system may contain symlinks created by an associated NFS-compatible client computer. This does not present a problem for the NFS-compatible client computer, because symlinks are inherently recognized and may be expanded by the NFS-compatible client computer's operating system. However, a CIFS-compatible client computer associated with the mixed protocol NAS system may have issues with these symlinks. To a CIFS-compatible client computer accessing the mixed protocol NAS system, symlinks may appear in the NAS system's file directory, but they may appear to be regular data objects. A CIFS-compatible client computer has no inherent way to distinguish a symlink from any other data file with data content. Thus, when the CIFS-compatible client computer tries to access a symlink stored on the mixed protocol NAS system, the symlink will not be expanded by the client computer's operating system because symlink expansion is not normally performed by this type of operating system.

To compensate for the CIFS-compatible client computer operating system's inability to perform symlink expansion, the mixed protocol NAS system may perform symlink expansion, because the NFS aspect of the mixed protocol NAS system can recognize and expand symlinks. In other words, should the CIFS-compatible client computer request access to a data object that is actually symlink, the NFS aspect of the NFS+CIFS NAS system may be able to determine whether the requested data object is a symlink. It further may be able to discover the symlink's target path information and forward access to the target. This operation may be automatic and transparent such that the CIFS-compatible client computer is not made aware that the NAS system has expanded the symlink.

As noted previously, a storage virtualization system tasked with performing storage virtualization operations on a NAS system will be configured to use the protocol of the associated NAS system and client computer. If the client computer is CIFS-compatible, and the NAS system uses the CIFS protocol, then the storage virtualization system will be configured to use the CIFS protocol. If the client computer is CIFS-compatible, and the NAS system uses the NFS+CIFS protocol, then the storage virtualization system will still be configured to use the CIFS protocol, because it is likely that data objects stored on the NFS+CIFS NAS system will have been stored using the CIFS protocol. However, data objects may also have been stored on the NFS+CIFS NAS system using the NFS protocol, since the NFS+CIFS NAS system may have previously been associated or may still be associated with a NFS-compatible client computer. As a result, the NFS+CIFS NAS system may contain symlinks.

In such a case, the NFS+CIFS NAS system may not have any issue with expanding symlinks, since as described previously, the NFS+CIFS NAS system can use the NFS protocol to expand symlinks for a CIFS-compatible client computer. However, if the storage virtualization system tasked with managing the NFS+CIFS NAS system is configured to use the CIFS protocol, it will not recognize which data objects are symlinks, and which data objects are data files with data content. As a result, when the storage virtualization system uses the CIFS protocol to migrate or copy data objects from a NFS+CIFS source server to a NFS+CIFS destination server, the symlinks may not properly migrate. Similarly, if the storage virtualization system uses the CIFS protocol to synchronize data objects between a NFS+CIFS source server and a NFS+CIFS destination server, symlinks may not properly synchronize. The symlink target path information stored as metadata or file attributes associated with the symlinks will not migrate from the source to the destination or properly synchronize between the source and destination, because the CIFS protocol used by the storage virtualization system will not recognize this information. One will appreciate that a direct download of data objects from one NFS+CIFS server to another NFS+CIFS server may preserve symlinks, since both of the servers will be able to recognize and expand symlinks. However, since such a download would require taking both servers offline, and since organizations prefer to use a storage virtualization system to perform such operations, it becomes important that the storage virtualization system recognize and handle symlinks on the NFS+CIFS NAS system.

What is therefore needed is a way to ensure that symlinks are properly identified on a mixed protocol NFS+CIFS NAS system. What is further needed is a way to ensure that if any symlinks are present on the source NAS system, that they are properly migrated, copied or synchronized to a destination NAS system.

BRIEF DESCRIPTION OF THE FIGURES

The present invention is illustrated by way of example and not limitation in the figures of the accompanying drawings, in which like references indicate similar elements, and in which.

DETAILED DESCRIPTION OF THE INVENTION

The present invention provides a storage virtualization system with the ability to identify symlinks stored on a mixed protocol NAS system, to identify the target path information associated with those symlinks, and to forward access to the symlink targets (also known as symlink expansion). Further, since the storage virtualization system will be able to identify and store the target path information for a symlink stored on a mixed protocol NAS system, this information will be preserved if the storage virtualization system migrates or copies the symlink to a second NAS system. Similarly, using the present invention, the storage virtualization system will be able to synchronize a symlink and its associated target path information with a second NAS system. One having skill in the art will appreciate that the present invention may be enabled on any NAS system using any protocol that does not inherently recognize, properly handle or preserve symlinks. The following description, however, will describe the invention for NAS systems using the NFS and/or CIFS protocols.

It should be appreciated that the present invention can be implemented in numerous ways, including as a process, an apparatus, a system, a device, a method, or a computer readable medium such as a computer readable storage medium comprising computer program instructions or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

1. The Storage Virtualization System

One will appreciate that the basic setup for a storage virtualization system may include the storage virtualization system, a source NAS server and a destination NAS server. The storage virtualization system may either be directly connected or connected over a network to at least two NAS systems, both of which, for example, are mixed protocol NFS+CIFS NAS systems. One skilled in the art will appreciate that the present invention works equally well with other combinations of protocols, and that the illustrative example is not meant to be limiting in any way.

Figure 1:
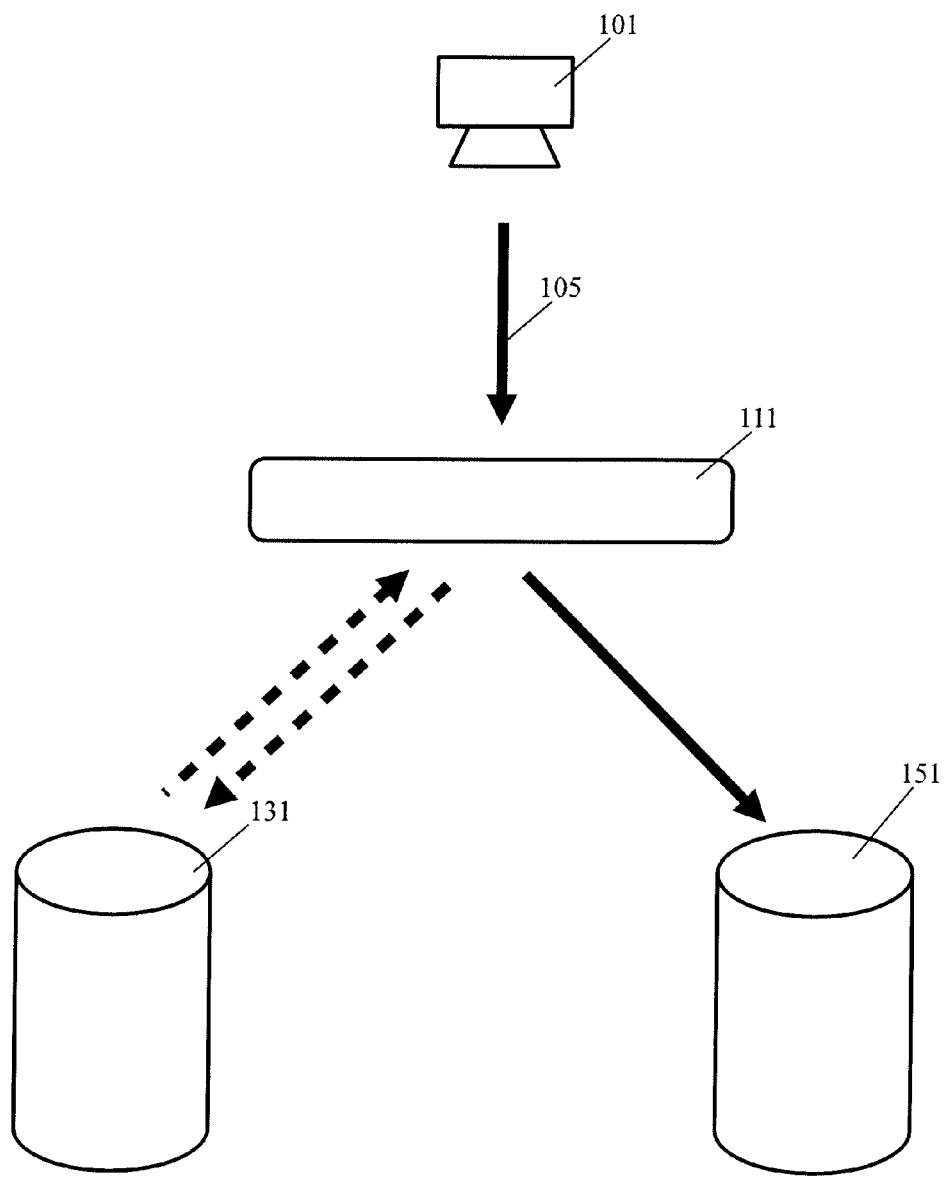
FIG. 1 is an exemplary block diagram depicting the elements of a storage virtualization system, according to one embodiment of the present invention.

The storage virtualization system may be placed as an intermediary between a client computer, a source NAS server and a destination NAS server. FIG. 1 illustrates one exemplary setup for a storage virtualization system. A client computer 101 accesses a source NAS system 131 connected to a network 105. The storage virtualization system 111 is an intermediary that may cause data from the source NAS system 131 to be redirected, migrated or synchronized to a destination NAS system 151. One will appreciate that FIG. 1 is merely an example of how a storage virtualization system 111 might interact with a source NAS system 131 and a destination NAS system 151, and that other setups are possible without departing from the scope of the present disclosure.

2. Creating and Accessing a Symlink

As described herein, it is assumed that the source NAS system 131 contains at least one symlink and symlink target. One will appreciate that in order to create a symlink, the user needs only enter a command providing the symlink file name and the target location. In UNIX, "ln-s" is the command for creating a symlink.

In a first example, to create a symlink (called "symlink_file1") that points to an associated file (called "target_file"), the syntax is:

$ ln-s target_file symlink_file1

The above example command line will create a data object called "symlink_file1" that will forward access to "target_file". Accordingly, the target for "symlink_file1" is "target_file" with "~/target_file" as its target path information. In a second example, to create a symlink called "symlink_file2" that points to an associated directory called "target_directory", the syntax is:

$ ln-s target_directory symlink_file2

In this example, the command line will create a data object called "symlink_file2" that will forward access to "target_directory". Accordingly, the target for "symlink_file2" is "target_directory" with "~/target_directory" as its target path information. One will appreciate that in these examples, additional options or arguments may be added to the "ln-s" command. These examples also assume that the symlinks and their targets are located in the same file directory, since no additional directory or subdirectory path information is presented in the above commands.

In NFS or UNIX, symlinks will appear as discrete recognizable data objects in the file directory. For example, if a directory called ~/dir/contains the symlinks and targets listed above, then a listing of the contents of ~/dir/may include these four data objects:

1. ~/dir/target_file
2. ~/dir/target_directory
3. ~/dir/symlink_file1
4. ~/dir/symlink_file2

To a NFS server, these are four distinct data objects. However, as discussed above, these symlinks and symlink targets may also be stored on a NFS+CIFS NAS system, and the client computer may be accessing the NAS system using the CIFS protocol. As a result, if for example, a client computer uses the CIFS protocol to request a listing of data objects in ~/dir/, then the listing may appear as:

1. dir\target_file
2. dir\target_directory

The data objects symlink_file1 and symlink_file2 are not recognized as symlinks and therefore may not appear to the CIFS-compatible client computer. However, it is more common that all four data objects will appear to the CIFS-compatible client computer, but selecting or attempting access to symlink_file1 or symlink_file2 will result in an error message. This is because the operating system on the CIFS-compatible client computer will not be able to identify the target path information for symlink_file1 or symlink_file2, because symlinks (and therefore target path information) are not inherently recognized by CIFS-compatible client computers. As a result, though the CIFS-compatible client computer may see these four data objects stored on the NFS+CIFS NAS system, it will not by itself be able to expand the symlinks to their respective targets.

As noted previously, this issue can also arise when the storage virtualization system has been configured to use the CIFS protocol. In this instance, the storage virtualization system may, for example, be performing storage virtualization operations between a NFS+CIFS source server and either a CIFS or NFS+CIFS destination server. These operations may include migrating or copying data objects from the source server to the destination server, or synchronizing data objects between the source server and the destination server.

If there are symlinks on the source server, then even though the storage virtualization system may migrate or copy these symlinks to the destination server (or synchronize these symlinks with corresponding data objects on the destination server), the target path information for these symlinks will not be preserved. This is because the CIFS-configured storage virtualization system will treat symlinks as "regular" data objects without recognizing or identifying the target path information associated with those data objects. As a result, even though the NFS+CIFS source server may still provide symlink expansion for the client computer, the destination server may not possess this capability. On the destination server, the symlinks may exist but will not point to any target because the storage virtualization system could not preserve the symlinks' target path information.

3. Symlink Discovery

Figure 2:
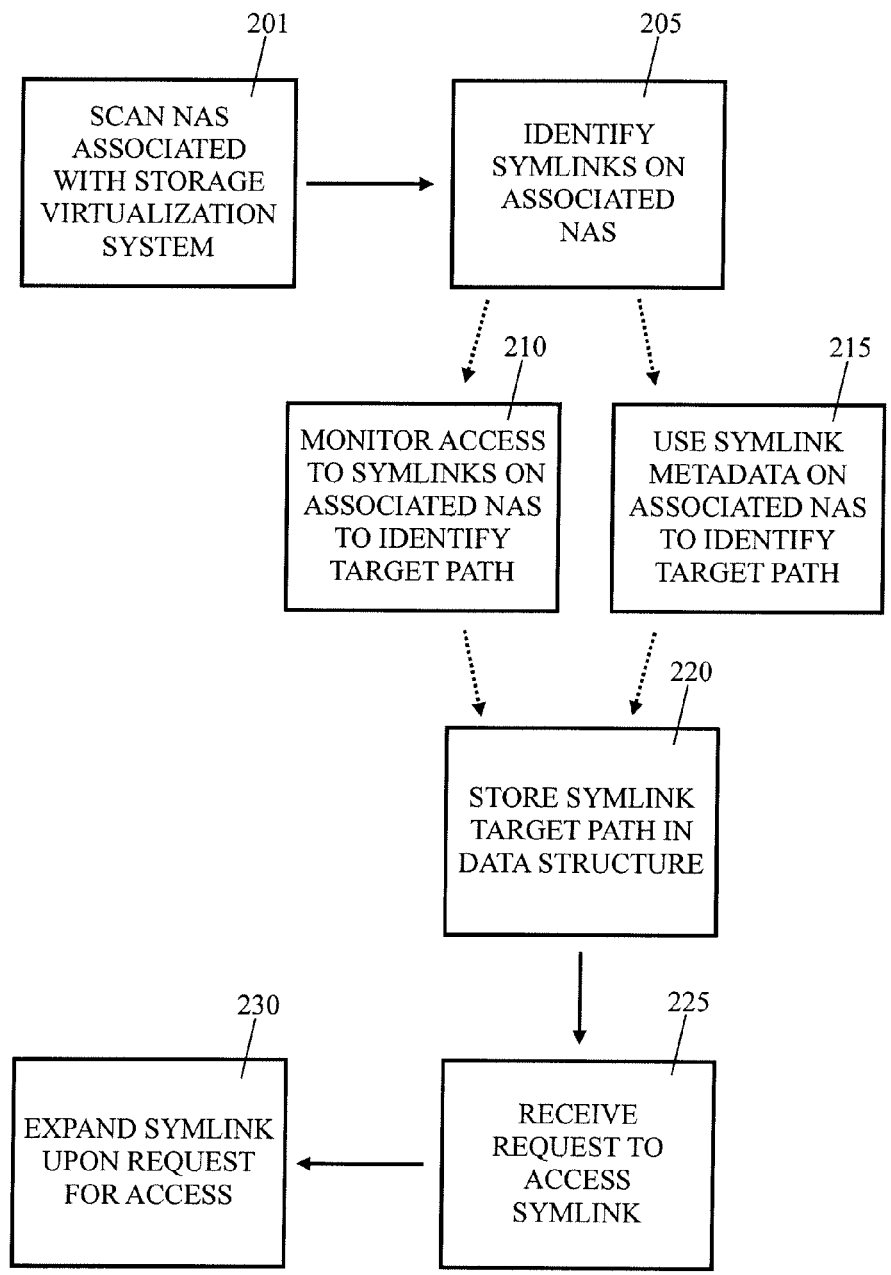
FIG. 2 is an exemplary flow diagram illustrating the steps of an embodiment of the present invention.

Before the storage virtualization system can perform symlink expansion, it must be able to identify which data objects stored on the NAS system are in fact symlinks. A person having ordinary skill in the art will appreciate that there are a number of ways that a storage virtualization system can discover which data objects on the NAS system are symlinks. FIG. 2 illustrates an exemplary flow diagram of the possible steps that may be involved. As a preliminary concept, a storage virtualization system is designed to monitor access to the data objects stored on its associated NAS system. Since the storage virtualization system may be responsible for migrating, copying and synchronizing data objects, it needs to keep track of the identity, type and current status of the data objects on its associated NAS systems.

Data objects may be identified by name, share, Mode or file ID ("FID"). Additionally, data objects may have file type identifiers, extensions or other metadata that identify whether they are files, directories, symlinks or other types of data objects. The storage virtualization system will store this information and will monitor when data objects are altered, moved or deleted. To discover this information, the storage virtualization system may perform a scan or a series of scans of an associated NAS system in order to map the identity, locations and types of data objects stored on the NAS system (step 201 of FIG. 2). This may occur when a storage virtualization system is first associated or connected to a NAS system, or after the NAS system has been associated with the storage virtualization system. One skilled in the art will appreciate that scans of the data objects stored on the associated NAS system may be performed periodically as well in order to update the storage virtualization system.

a. Multi-Protocol Scan

Since symlinks are only identifiable in the NFS protocol, a scan of a NFS+CIFS NAS system using the NFS protocol would readily reveal which data objects are symlinks, and which are not. However, since a CIFS-compatible client computer may be accessing the NFS+CIFS NAS system through the storage virtualization system, then it would be important for the storage virtualization system to recognize which data objects are symlinks when using the CIFS protocol. Therefore, a multi-protocol scan may be useful since the results may uncover data objects and attributes not found in a single-protocol (NFS-only) scan. This is because a multi-protocol scan may be comprised of separate or simultaneous scans in different protocols. For example, in an embodiment where two scans are used, a first scan may be a NFS query and the second scan may be a CIFS query. Alternatively, the first scan may be a CIFS query and the second scan may be a NFS query. The scans may be simultaneously performed as well as sequentially performed, but one will appreciate that a single multi-protocol scan may be comprised of separate scans in the different protocols. The computer instructions for the multi-protocol scan and the results of the scan will be discussed further below. One with ordinary skill in the art will appreciate that symlinks may be identified without using a multi-protocol scan without departing from the scope of the invention.

A storage virtualization system 111 may perform the steps of a multi-protocol scan upon association with or connection to a source NAS 131. These steps may be performed after the source NAS 131 has been associated or connected to the storage virtualization system 111, or the steps may be repeated as necessary to ensure scan results are up to date. The steps may also be user-initiated. To begin, the storage virtualization system 111 may issue a computer instruction or command to scan the contents of the source NAS system 131. One will appreciate that the command may be issued by a daemon or other semi-automated software application within the storage virtualization system 111. The command may also be issued by a user, or as part of a routine automated system task. If the storage virtualization system 111 is issuing a NFS command, then the command may be "READDIR" or "READDIRPLUS" or the equivalent. If the storage virtualization system 111 is issuing a CIFS command, then the command may be "FindFirst2" or "FindNext2" or the equivalent. One of ordinary skill in the art will appreciate that there are a number of equivalent commands that may be used to scan the NAS system 131, so long as the command is intended to elicit a listing of data objects or information about the data objects stored in NAS system 131.

After issuing a first command to scan NAS system 131 using a first protocol in step 201, the storage virtualization system 111 may issue a second command to scan NAS system 131 using a second protocol. For example, if the storage virtualization system 111 issued a first scan command in NFS, then the second scan command may be in CIFS. Similarly, if the storage virtualization system 111 issued the first scan command in CIFS, then the second scan command may be in NFS. A person skilled in the art will appreciate that other protocols may be used besides NFS and CIFS, and that more than two scans may be performed. One skilled in the art will also appreciate that the NFS and CIFS scans of NAS system 131 may occur simultaneously. The results of the multi-protocol scan may then be stored within storage virtualization system 131 for future use (step 210 of FIG. 2).

A person having skill in the art will appreciate that the results of the multi-protocol scan or scans will be returned to the storage virtualization system and stored for later use. The results may be stored temporarily or permanently. The results may be in the form of an index, data structure, or may resemble the information returned upon issuance of a "ls-1" command on a UNIX system, or a "dir" command on a Windows® system. In most cases, the scan results will comprise a listing of the names or identifiers ("FIDs") for the data objects stored in the NAS system, as well as the file attributes, directory or sub-directory relationships, and the path address for each data object.

In an embodiment, results from a scan of NAS system 131 using a first protocol are received and stored, then results from a scan of NAS system 131 using a second protocol are received and stored. If NAS system 131 is being scanned using the first and second protocol at the same time, then scan results may be received simultaneously or near simultaneously, and then stored. One skilled in the art will appreciate that the sequence of when scan results are received and stored may vary. In addition, the format of the received scan results may vary. Further, one skilled in the art will appreciate that the format of the stored results may vary. The present invention provides software instructions for the storage virtualization system to issue the scans and store the received results.

One will appreciate that in the above examples, the steps of the multi-protocol scan are performed upon a source NAS system, such as NAS system 131. The multi-protocol scan may be performed, however, upon any NAS associated with storage virtualization system 111, including destination NAS system 151. The results from a multi-protocol scan of destination NAS system 151 may also be stored by the storage virtualization system 111. These results may be stored separately or may be used to build a mapping index. Exemplary steps for building a mapping index using the results of a multi-protocol scan are discussed in related U.S. patent application Ser. No. 11/966,733, entitled SYSTEM AND METHOD FOR RECONCILING MULTI-PROTOCOL SCAN RESULTS BY A STORAGE VIRTUALIZATION SYSTEM. Applying these steps, if the multi-protocol scan includes a scan using the NFS protocol, then a scan using the CIFS protocol, then the storage virtualization system may match or associate the results from the NFS scan with the results from the CIFS scan. In doing so, the storage virtualization system may be able to direct access to a requested data object regardless of whether the request is in the NFS protocol or in the CIFS protocol.

After the mapping index is built, the present invention may use that index to identify which data objects on the associated NAS system are symlinks (step 205 of FIG. 2). Alternatively, the present invention may simply use the results of the multi-protocol scan to identify which data objects on the associated NAS system are symlinks (step 205 of FIG. 2). Symlinks may be identified by their associated file attributes. A symlink may have associated metadata or similar information that identifies it to be a symlink instead of a data file with data content. As such, the multi-protocol scan or the mapping index built from the results of the multi-protocol scan may contain this information, which may then be used to identify the symlinks stored on the associated NAS system. Simply knowing which data objects are symlinks will not be sufficient to enable a storage virtualization system to expand the symlinks. The target path information for each symlink must be discovered by or otherwise provided to the storage virtualization system. Once the target path information is discovered, this information may be stored in a data structure or incorporated in the mapping index for later referral by the storage virtualization system. This is discussed further below.

The following description focuses on two exemplary methods for discovering target path information. The first method described below uses a storage virtualization system to monitor requests for access to identified symlinks stored on the associated NAS system. The second method described below uses a symlink's file attributes uncovered during a multi-protocol scan or other means. One with skill in the art will appreciate that there may be other ways to discover a symlink's target path information and that the two methods described below are merely exemplary and are not intended to limit the invention in any way.

4. Symlink Target Discovery a. Symlink Monitoring

Even though the present invention provides a storage virtualization system with the capability to expand symlinks stored on an associated NFS+CIFS NAS system, the present invention will not prevent the associated NFS+CIFS NAS system from performing symlink expansion. In contrast, the storage virtualization system may take advantage of the NAS system's inherent symlink expansion capabilities. As noted above, the storage virtualization system will commonly monitor client computer requests for access to data objects stored on an associated NAS system. This ensures that any changes made to the data objects stored on an associated NAS server are tracked by the storage virtualization system. For example, when a client computer requests access to a data object stored on a NAS system associated with a storage virtualization system, the accessed data object's content may change, or the data object's file attributes, such as "last access time," may change. By design, the storage virtualization system tracks these changes.

In another example, when a client computer requests access to a symlink on the NFS+CIFS NAS system, which then expands the symlink, the storage virtualization system will note the transaction (step 210 of FIG. 2) and the location to where the symlink is forwarded. Because the storage virtualization system has not yet been set up to perform symlink expansion, it will permit the NFS+CIFS NAS system to perform the symlink expansion in order to discover the location or path address to where the symlink forwarded. This location or path address is the symlink's target path information. Once the storage virtualization system discovers the target path information, this information may be stored in a data structure (step 220) and used by the storage virtualization system whenever the symlink is accessed. While this method may be seen as a passive approach to discover symlink target path information, it is nonetheless effective in enabling symlink expansion by a storage virtualization system. One skilled in the art will appreciate that the step of monitoring access to a symlink may occur whenever that symlink is initially accessed. Subsequent requests for access to that symlink will result in symlink expansion by the storage virtualization system, since it will know the target path information.

The foregoing method of monitoring symlinks may occur after symlinks have been identified on the NAS system, such as after performing the multi-protocol scan. As noted previously, monitoring access to a symlink is one way to discover that symlink's target and target path information. The storage virtualization system may also use the steps of monitoring data objects to identify which data objects are symlinks. For example, as noted above, the storage virtualization system may be set to monitor requests for access to data objects stored on an associated NAS system. During this monitoring, the storage virtualization system may note that whenever one data object is accessed, changes may appear in another data object. In other words, the storage virtualization system may note that whenever a particular data object is requested by the client computer, another data object may be accessed or provided by the NAS system. Therefore, even though the NFS+CIFS server's symlink expansion may be transparent, the storage virtualization may make the association that there is a relationship between the requested data object and the accessed data object. Using this information, the storage virtualization system may then assume that the requested data object is a symlink, and the accessed data object is the symlink's target. The target path information for the accessed data object may then be stored in a data structure (step 220) for use by the storage virtualization system.

The data structure may be made part of the results from the scan of the data objects on the NAS system, or may form a separate data structure that the storage virtualization system may refer to whenever access to a symlink is requested. The data structure may be a hash table, tree, database, table, associative array or other listing that stores a symlink's target path location information. As discussed previously, the target path information may be stored in the data structure as an absolute path address, a relative path address or as data representative of the target path information. The data structure may be a mapping index or form part of a mapping index. Alternatively, the data structure may even complement a mapping index or associate with a mapping index. A person with ordinary skill in the art will appreciate that the data structure may vary in format, so long as identifiers for the symlinks and their respective target path information (or data representative of their respective target path information) are stored for access by the storage virtualization system.

Using the above steps, the storage virtualization system will be able to discover the target path information for identified symlinks, or further, identify which data objects are symlinks, as well as the target path information for those symlinks. As noted previously, this is just one method for discovering symlink target path information.

b. Symlink Metadata

Alternatively, in addition to identifying whether a data object is in fact a symlink, the multi-protocol scan may also discover target path information for the symlink. For example, in some NAS systems, not only is a symlink identified by its file attributes or associated metadata, but the path address for the symlink's target may also be stored or associated with the symlink. This path address may be used as the symlink's target path information. As such, an embodiment of the present invention may enable the storage virtualization system to discover the symlink's target path information using this metadata (step 215 of FIG. 2).

Once the storage virtualization system has identified a symlink, it may then read the metadata associated with that symlink to discover if any target path information is stored. If so, then the storage virtualization system may extract this information and store it in a data structure (step 220 of FIG. 2) as described above. The storage virtualization system may then use the data structure whenever the symlink is accessed. This method may be considered a more active approach to symlink target discovery, but it is nonetheless effective in enabling symlink expansion by a storage virtualization system.

One having skill in the art will therefore appreciate that the two methods described above may provide a storage virtualization system with the capability to identify symlinks stored on a NFS+CIFS NAS system, and/or the respective target path information for those symlinks. These two methods are merely representative examples. One skilled in the art will be able to implement other methods for discovering symlink target path information on a NFS+CIFS NAS system without departing from this disclosure or the spirit of the present invention.

5. Symlink Expansion

Once the storage virtualization system has identified symlinks stored on an associated NFS+CIFS NAS system, has discovered the target path information for those symlinks, and has stored the target path information in a data structure, it may then have the information needed to expand those symlinks. As noted previously, while the present invention does not disable symlink expansion by the associated NFS+CIFS server, it allows the storage virtualization system to expand symlinks itself. The storage virtualization system thereby ensures access to a symlink target, avoiding issues that may potentially arise from transparent symlink expansion by a NFS+CIFS NAS system.

In step 225, the storage virtualization system will receive a request to access the symlink. Requests will be passed through the storage virtualization system because, as illustrated in FIG. 1, the storage virtualization system 111 is an intermediary between a client computer 101 and its associated NAS system. Upon receipt of such a request, in step 230, the storage virtualization system may refer to the data structure to find the symlink's target path information. By referring to the data structure to resolve the target path location information for a requested symlink, the storage virtualization system may search, look up or match the requested symlink with the target path information stored in the data structure, then forward access to the symlink target. As a result, symlink expansion is performed by the storage virtualization system on the network, rather than by the client computer operating system or the NAS system.

One will appreciate that not all requests for access to the symlink require expansion. For example, if the client computer is passing a command to move, rename or delete the symlink, expansion will not be necessary. An aspect of the present invention will recognize when expansion is required and when it is not. Certain computer commands or instructions may move, rename or delete data objects. An aspect of the present invention may prevent symlink expansion by the storage virtualization system when those certain commands are issued.

6. Symlink Preservation

As discussed previously, because symlinks and their associated target locations are identified and stored by the storage virtualization system, this information may be preserved during storage virtualization operations. If symlinks are synchronized, migrated or copied to a destination server, the storage virtualization system may ensure that when those symlinks are accessed, they will be properly expanded to their targets. Any symlinks on the source server will be successfully migrated or synchronized to the destination server, regardless of whether the destination server is a NFS+CIFS NAS system or even a CIFS NAS system. The data structure created using the present invention will be able to keep symlink target path information intact.

One having skill in the art will appreciate that in the description above and throughout, numerous specific details are set forth in order to provide a thorough understanding of the present invention. It will be evident, however, to one of ordinary skill in the art, that the present invention may be practiced without these specific details. In other instances, well-known structures and devices are shown in block diagram form to facilitate explanation. The description of the preferred embodiments is not intended to limit the scope of the claims appended hereto.

What is claimed is:

1. A method for identifying symlink target path location comprising:

providing a storage virtualization system coupled to a first Network Attached Storage ("NAS") system, the storage virtualization system including a data structure for storing data and configured to synchronize, migrate and/or copy a data object stored on the first NAS system to a second NAS system;

discovering, by the storage virtualization system, using a multi-protocol scan, at least one data object stored on the first NAS system that is a symlink associated with a target path location;

matching the results from a first scan of the first NAS system using a first protocol with the results from a second scan of the first NAS system using a second protocol;

discovering, by the storage virtualization system, the target path location associated with the symlink, wherein the target path location is discovered by monitoring requests for access to the at least one data object on the first NAS system or by using metadata or file attributes associated with the at least one data object;

storing the target path location in the data structure for performing symlink expansion;

receiving, by the storage virtualization system, a request for access to the at least one data object;

searching, by the storage virtualization system, the data structure for the stored target path location of the requested at least one data object discovered to be a symlink; and forwarding access to the target path location in response to the request for access.

2. The method of claim 1, wherein discovering the at least one data object that is a symlink comprises:

scanning, by the storage virtualization system, the first NAS system for a file attribute associated with the at least one data object, wherein the file attribute indicates that the at least one data object as a symlink.

3. The method of claim 1, wherein discovering the target path location associated with the symlink comprises:

receiving, by the storage virtualization system, a request for access to the discovered symlink;

routing the request to the discovered symlink stored in the first NAS system; and monitoring, by the storage virtualization system, the first NAS system to detect access to a symlink target path location following the request, wherein the access to the symlink target path location is provided by the first NAS system.

4. The method of claim 1, wherein discovering the target path location associated with the symlink comprises:

scanning, by the storage virtualization system, a plurality of file attributes stored in the first NAS system for the target path location associated with the discovered symlink.

5. The method of claim 1, wherein the target path location is a path address.

6. The method of claim 1, wherein the file attribute that indicates that the at least one data object is a symlink is found when using one of the first or second protocols, and is not found when using another of the first or second protocols.

7. A computer program product, comprising a non-transitory computer usable medium having a computer readable program code embodied therein, the computer readable program code adapted to be executed to implement a method for discovering a symlink stored in a Network Attached Storage ("NAS") system, the method comprising:

providing a storage virtualization system coupled to a first NAS system, the storage virtualization system including a data structure for storing data and configured to synchronize, migrate and/or copy a data object stored on the first NAS system to a second NAS system;

scanning, by the storage virtualization system, using a multi-protocol scan, the first NAS system for a file attribute stored on the NAS system and associated with at least one data object, wherein the file attribute indicates that the at least one data object is a symlink matching the results from a first scan of the first NAS system using a first protocol with the results from a second scan of the first NAS system using a second protocol;

discovering, by the storage virtualization system, the target path location associated with the symlink, wherein the target path location is discovered by monitoring requests for access to the at least one data object on the first NAS system or by using metadata or file attributes associated with the at least one data object;

storing the target path location in the data structure for performing symlink expansion;

receiving, by the storage virtualization system, a request for access to the at least one data object;

searching, by the storage virtualization system, the data structure for the stored target path location of the requested at least one data object discovered to be a symlink; and forwarding access to the target path location in response to the request for access.

8. The computer program product of claim 7, wherein the file attribute that indicates that the at least one data object is a symlink is found when using one of the first or second protocols, and is not found when using another of the first or second protocols.

9. A computer program product, comprising a non-transitory computer usable medium having a computer readable program code embodied therein, the computer readable program code adapted to be executed to implement a method for discovering symlink target path location, the method comprising:

providing a storage virtualization system coupled to a first NAS system, the storage virtualization system including a data structure for storing data, the storage virtualization system configured to synchronize, migrate and/or copy a data object stored on the first NAS system to a second NAS system;

discovering, by the storage virtualization system, using a multi-protocol scan, at least one data object stored on the first NAS system that is a symlink associated with a target path location;

matching the results from a first scan of the first NAS system using a first protocol with the results from a second scan of the first NAS system using a second protocol;

discovering, by the storage virtualization system, target path location associated with a symlink stored on the first NAS system, wherein the target path location is discovered by monitoring requests for access to the at least one data object on the first NAS system or by using metadata or file attributes associated with the at least one data object;

storing the discovered target path location in the data structure for performing symlink expansion;

receiving, by the storage virtualization system, a request for access to the at least one data object;

searching, by the storage virtualization system, the data structure for the stored target path location of the requested at least one data object discovered to be a symlink; and forwarding access to the target path location in response to the request for access.

10. The computer program product of claim 9, wherein the target path location is a path address.

11. The computer program product of claim 9, wherein the file attribute that indicates that the at least one data object is a symlink is found when using one of the first or second protocols, and is not found when using another of the first or second protocols.

12. A computer program product, comprising a non-transitory computer usable medium having a computer readable program code embodied therein, the computer readable program code adapted to be executed to implement a method for expanding a symlink, the method comprising:

providing a storage virtualization system coupled to a first NAS system, the storage virtualization system including a data structure for storing data, the storage virtualization system configured to synchronize, migrate and/or copy a data object stored on the first NAS system to a second NAS system;

discovering, by the storage virtualization system, using a multi-protocol scan, at least one data object stored on the first NAS system that is a symlink associated with a target path location;

matching the results from a first scan of the first NAS system using a first protocol with the results from a second scan of the first NAS system using a second protocol;

discovering, by the storage virtualization system, the target path location associated with the symlink, wherein the target path location is discovered by monitoring requests for access to the at least one data object on the first NAS system or by using metadata or file attributes associated with the at least one data object;

storing the target path location in the data structure for performing symlink expansion;

receiving, by the storage virtualization system, a request for access to the discovered symlink stored on the first NAS system;

referring, by the storage virtualization system, to the data structure to resolve the target path location associated with the requested symlink; and forwarding, by the storage virtualization system, access to the target path location upon encountering the request for access to the discovered symlink.

13. The computer program product of claim 12, wherein the target path location is a path address.

14. The computer program product of claim 12, wherein the file attribute that indicates that the at least one data object is a symlink is found when using one of the first or second protocols, and is not found when using another of the first or second protocols.

15. A computer program product, comprising a non-transitory computer usable medium having a computer readable program code embodied therein, the computer readable program code adapted to be executed to implement a method for discovering symlink target path location information stored in a Network Attached Storage ("NAS") system, the method comprising:

providing a storage virtualization system coupled to a first NAS system, the storage virtualization system including a data structure for storing data and configured to synchronize, migrate and/or copy a data object stored on the first NAS system to a second NAS system;

discovering, by the storage virtualization system, using a multi-protocol scan, at least one data object stored on the first NAS system that is a symlink associated with a target path location;

matching the results from a first scan of the first NAS system using a first protocol with the results from a second scan of the first NAS system using a second protocol;

discovering, by the storage virtualization system, the target path location associated with the symlink, wherein the target path location is discovered by monitoring requests for access to the at least one data object on the first NAS system or by using metadata or file attributes associated with the at least one data object;

storing the target path location in the data structure for performing symlink expansion;

receiving, by the storage virtualization system, a request for access to the at least one data object;

searching, by the storage virtualization system, the data structure for the stored target path location of the requested at least one data object discovered to be a symlink; and forwarding access to the target path location in response to the request for access.

16. The computer program product of claim 15, wherein discovering the at least one data object stored on the first NAS comprises:

scanning, by the storage virtualization, the first NAS system for a file attribute associated with the at least one data object, wherein the file attribute indicates that the at least one data object is a symlink.

17. The computer program product of claim 15, wherein discovering the target path location associated with the symlink comprises:

receiving, by the storage virtualization system, a request for access to the discovered symlink;

routing the request to the discovered symlink stored in the first NAS system; and monitoring, by the storage virtualization system, the first NAS system to detect access to a symlink target path location following the request, wherein the access to the symlink target path location is provided by the first NAS system.

18. The computer program product of claim 15, wherein discovering the target path location associated with the symlink comprises:

scanning, by the storage virtualization system, a plurality of file attributes stored in the first NAS system for the target path location associated with the discovered symlink.

19. The computer program product of claim 15, wherein the target path location is a path address.

20. The computer program product of claim 15, wherein the file attribute that indicates that the at least one data object is a symlink is found when using one of the first or second protocols, and is not found when using another of the first or second protocols.

* * * * *